Aug. 20, 1957   M. ROSENHEIMER   2,803,806
TRANSFORMERS, IN PARTICULAR FOR ELECTRICAL WELDING MACHINES
Filed Dec. 1, 1953
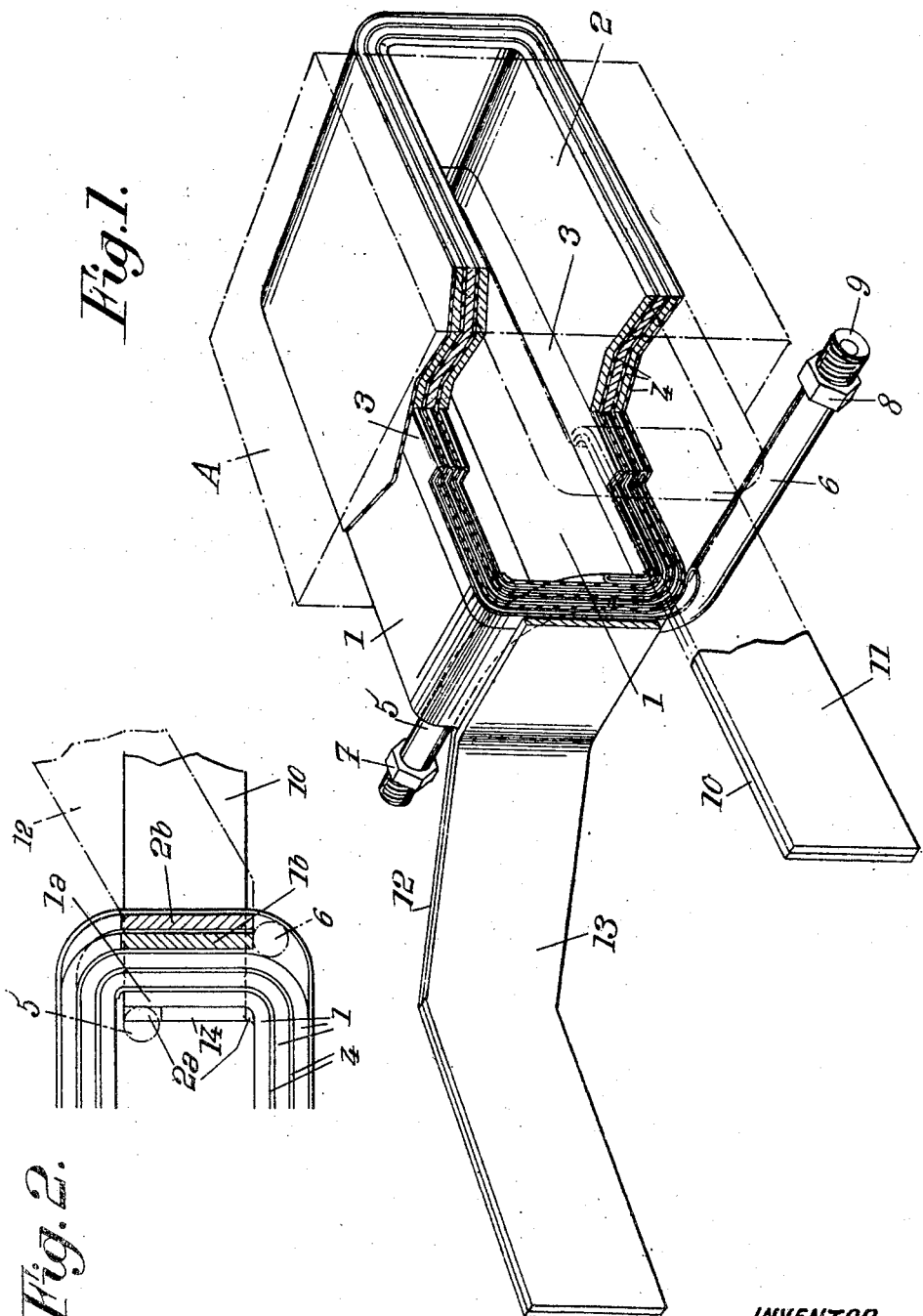
INVENTOR
MAX ROSENHEIMER
BY
Richardson, David and Nadow
his ATTORNEYS.

United States Patent Office 2,803,806
Patented Aug. 20, 1957

2,803,806

TRANSFORMERS, IN PARTICULAR FOR ELECTRICAL WELDING MACHINES

Max Rosenheimer, L'Hay-les-Roses, France, assignor to Company "ARO," Paris, France, a society of the Republic of France Application December 1, 1953, Serial No. 395,517

Claims priority, application France December 11, 1952

5 Claims. (Cl. 336—61)

The present invention relates to transformers, and in particular to step down transformers through the secondary of which high intensity currents are to flow. My invention is more especially but not exclusively concerned with transformers for electric welding machines, and especially portable spot welding machines such as welding tongs.

The object of my invention is to provide a transformer having a cooling system which is more efficient than those known at the present time while occupying a smaller volume.

The secondary of the transformer according to my invention is constituted essentially by a copper sheet wound in coil-like fashion, and it is characterized in that this sheet is constituted by the juxtaposition of a plurality of copper strips in line with one another and extending transversely to the generatrices of the coil-like structure, a tube of a thickness equivalent to that of said strips being interposed between every two strips for the circulation of a cooling fluid.

Preferred embodiments of the present invention will be hereinafter described with reference to the accompanying drawings, given merely by way of example, and in which:

Fig. 1 is a perspective view, with parts cut away, of the secondary of a transformer according to my invention.

Fig. 2 is an end view from the rear of said transformer secondary.

The secondary of the transformer according to my invention is constituted by a copper sheet wound in coil-like fashion, every spire of the coil-like structure being suitably insulated from the next spire.

It has already been proposed to constitute the secondaries of transformers for welding machines exclusively by hollow conductors through which cooling water is caused to circulate. But the section afforded to the passage of electric current by such conductors is very small with respect to the total volume.

It has also been proposed to constitute such secondaries by a cast copper plate including a pipe embedded therein during molding and through which the cooling water is made to circulate. Such transformers are cumbersome and heavy, which limits their use to fixed welding machines and makes it impossible to use them in portable welding devices. Furthermore, the coefficient of conductivity of cast copper is relatively low, which is an obstacle to a good cooling.

In order to obviate this drawback, according to my invention the plate of the sheet which constitutes the winding of the secondary is constituted by a plurality of rolled copper strips juxtaposed in line one with another and I interpose between every two copper strips a tube, preferably suitably flattened, of a thickness equivalent to that of the strips, whereby the whole, once assembled by brazing or the like, forms a composite sheet of uniform thickness which is spiral wound, every spire being insulated from the next one by a sheet of an insulating substance.

Each of the strips is advantageously made of rolled copper, which has well known advantages over cast copper, and the elements forming the cooling pipe or pipes are brazed on these strips.

According to the embodiment illustrated by Figs. 1 and 2, I make use of two strips 1 and 2 between the faces of each of which is brazed a pipe 3 of suitable flattened shape (for the sake of clarity, on the drawing I have shown section lines only in the portions of this pipe which are in cross section in Fig. 1) and the sheet thus formed is spiral wound as better visible on Fig. 2, a sheet 4 of an insulating substance being interposed between every two spires.

The ends of pipe 3 are curved outwardly and these ends are connected to a circuit through which cooling water is circulated. For this purpose, the ends 5 and 6 of this pipe are caused to project on either side of the secondary, these ends corresponding respectively to the inner and outer ends of the coiled sheet; these ends of the pipe may be made of cylindrical shape, whereas the coiled portion is flattened.

I have shown at 7 and 8 threaded connections rotatable with respect to the pipe but held thereon by widened portions such as 9. By rotating these connections through the nuts which are integral therewith in similar threaded connections provided at the ends of said circuit, it is possible to obtain a watertight packing. In order to avoid short-circuiting the secondary of the transformer, I interpose in the water circulation circuit any suitable electric insulating element. Said circuit may further be used for cooling each of the electrodes.

It will be readily understood that the plate has a uniform thickness equal to that of the strips (and of the flattened pipe) which constitute it, in opposition with what takes place in structures where, according to the known method above referred to, a pipe is embedded in the sheet. In this case, at the place of the pipe, the thickness is equal to that of the pipe added up to that of copper on either side thereof.

Of course, instead of constituting the sheet by two strips juxtaposed in the same plane and provided with a flattened pipe between them, said sheet may be constituted by a greater number of strips, for instance three, disposed side by side with two pipes interposed between them.

Concerning the output bars of the secondary, each of them may be constituted either by a single plate brazed on one of the ends of the winding preferably by two plates each brazed to the end of one of the strips 1 or 2. Thus, on the edge of the end 1a of strip 1, it is possible to braze an output plate 10 and, on the edge of the inner end 2a of strip 2, an output plate 11. It is then necessary, in order to leave a passage for output plate 10, to offset the end 2a of strip 2 inwardly with respect to the end 1a of strip 1, as shown by Fig. 2. For this purpose, I fix on the inner end 1a a spacing element 14 of a thickness equal to that of plate 11, this element, which is in line with 2a, serving to support the end 5 of the pipe. Furthermore, on the outer ends 1b and 2b of plates 1 and 2 are brazed two output plates 12 and 13 and end 2b is offset outwardly with respect to 1b for the passage of plate 12. A spacing element analogous to element 14 will be provided on the end 2b of plate 2 to support the end 6 of the pipe. Plates 12 and 13 have been cut away on Fig. 2.

I may mount a transformer as above described on all kinds of welding tongs existing in the art, in a fashion which is known in itself, the primary being arranged, for instance, by disposing it around the secondary, as diagrammatically shown in dotted lines at A in Fig. 1.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A transformer, in particular for electric welding machines, having a secondary consisting chiefly of a sheet wound in coil-like fashion, this sheet being constituted by at least two juxtaposed strips of a conducting material extending in a direction transverse to that of the generatrices of the coiled sheet and in line with one another, and a tube of a conducting material of a thickness equal to that of the strips fixed between every two strips and in line therewith for circulation of fluid cooling therethrough.

2. A transformer according to claim 1 in which every strip is made of rolled copper.

3. A transformer according to claim 1 in which said tube is flat.

4. A transformer according to claim 1 in which the tube is curved at both ends thereof so as to project laterally from the structure.

5. A transformer according to claim 1 including two output bars, one of said bars being formed by the juxtaposition of conducting plates fixed to said strips respectively, at one end thereof, the other of said bars being formed by the juxtaposition of conducting plates fixed to said strips respectively, at the other end thereof.

References Cited in the file of this patent

UNITED STATES PATENTS

| | | |
|---|---|---|
| 513,420 | Rowland | Jan. 23, 1894 |
| 2,128,086 | Gakle | Aug. 23, 1938 |
| 2,378,884 | Seifert | June 19, 1945 |
| 2,542,851 | Wentz et al. | Feb. 20, 1951 |